US012755550B2

(12) United States Patent
Yanagisawa et al.

(10) Patent No.: US 12,755,550 B2
(45) Date of Patent: Oct. 6, 2026

(54) INFORMATION PROCESSING APPARATUS, INFORMATION PROCESSING METHOD, INFORMATION PROCESSING SYSTEM, AND COMPUTER READABLE MEDIUM

(71) Applicant: NEC Corporation, Tokyo (JP)

(72) Inventors: Kei Yanagisawa, Tokyo (JP); Tetsuro Hasegawa, Tokyo (JP); Kosei Kobayashi, Tokyo (JP); Hiroaki Aminaka, Tokyo (JP); Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 364 days.

(21) Appl. No.: 18/278,546

(22) PCT Filed: Mar. 30, 2021

(86) PCT No.: PCT/JP2021/013604
§ 371 (c)(1),
(2) Date: Aug. 23, 2023

(87) PCT Pub. No.: WO2022/208668
PCT Pub. Date: Oct. 6, 2022

(65) Prior Publication Data
US 2024/0153276 A1 May 9, 2024

(51) Int. Cl.
*H04N 7/18* (2006.01)
*G06T 7/20* (2017.01)
(Continued)

(52) U.S. Cl.
CPC ................ *G06V 20/54* (2022.01); *G06T 7/20* (2013.01); *G06V 20/625* (2022.01);
(Continued)

(58) Field of Classification Search
CPC ........ H04N 7/18; G06V 20/54; G06V 20/625; G06V 2201/07; G06T 7/20; G06T 2207/30201; G06T 2207/30252
(Continued)

(56) References Cited

U.S. PATENT DOCUMENTS 8,248,219 B2 * 8/2012 Sato ......................... B60Q 9/00
340/459
9,884,588 B2 * 2/2018 Park ...................... G01S 13/931
(Continued)

FOREIGN PATENT DOCUMENTS

JP H09-146916 A 6/1997
JP 2008-052464 A 3/2008
(Continued)

OTHER PUBLICATIONS

International Search Report for PCT Application No. PCT/JP2021/013604, mailed on Jun. 29, 2021.

*Primary Examiner* — Trang U Tran
(74) *Attorney, Agent, or Firm* — Sughrue Mion, PLLC

(57) ABSTRACT

An information processing apparatus (10) includes: determination means (11) for determining a range for providing notification of information regarding a specific object on the basis of a moving direction of the specific object detected on the basis of an image, a position where the image has been captured, and an elapsed time since the image has been captured; and transmission means (12) for transmitting the information regarding the specific object to a device corresponding to the range determined by the determination means.

15 Claims, 8 Drawing Sheets

(51) Int. Cl.
*G06V 20/54* (2022.01)
*G06V 20/62* (2022.01)

(52) U.S. Cl.
CPC ............... *G06T 2207/30201* (2013.01); *G06T 2207/30252* (2013.01); *G06V 2201/07* (2022.01)

(58) Field of Classification Search
USPC .......................................................... 348/148
See application file for complete search history.

(56) References Cited

U.S. PATENT DOCUMENTS

| | | | | |
|---|---|---|---|---|
| 10,891,495 | B2 * | 1/2021 | Takamatsu | G06T 7/85 |
| 2020/0380699 | A1 | 12/2020 | Amo | |
| 2022/0169245 | A1 * | 6/2022 | Hieida | G08G 1/162 |

FOREIGN PATENT DOCUMENTS

| | | | |
|---|---|---|---|
| JP | 2011-215767 | A | 10/2011 |
| JP | 2021-002733 | A | 1/2021 |
| WO | 2016/132769 | A1 | 8/2016 |
| WO | 2018/180454 | A1 | 10/2018 |

* cited by examiner

501

| OBJECT ID | IMAGE | FEATURE INFORMATION | FEATURE AMOUNT OF IMAGE | TRANSPORTATION MEANS | DETECTION POSITION | DETECTION TIME | ESTIMATED TIME | RANGE | NOTIFICATION DESTINATION INFORMATION |
|---|---|---|---|---|---|---|---|---|---|
| SUSPICIOUS PERSON A | IMAGE A | FEATURE INFORMATION A | FEATURE AMOUNT A OF IMAGE | RACING BICYCLE | INTERSECTION A | 13 : 15 | 13 : 20 | RANGE A | NOTIFICATION DESTINATION INFORMATION A |
| VEHICLE B | . . . | . . . | . . . | . . . | . . . | . . . | . . . | . . . | . . . |
| . . . | . . . | . . . | . . . | . . . | . . . | . . . | . . . | . . . | . . . |

Fig. 6

INFORMATION PROCESSING APPARATUS, INFORMATION PROCESSING METHOD, INFORMATION PROCESSING SYSTEM, AND COMPUTER READABLE MEDIUM

This application is a National Stage Entry of PCT/JP2021/013604 filed on Mar. 30, 2021, the contents of all of which are incorporated herein by reference, in their entirety.

TECHNICAL FIELD

The present disclosure relates to an information processing apparatus, an information processing method, an information processing system, and a non-transitory computer readable medium storing a program.

BACKGROUND ART

Patent Literature 1 describes a video management server that matches a security camera video with image data of a face registered in advance as reference video information and detects a person to be detected. In addition, Patent Literature 1 describes a video management server that preferentially performs matching processing between video information from another security camera in the vicinity of a person to be detected in a moving direction of the person to be detected and image data of the person to be detected. In addition, Patent Literature 1 describes notifying a notification destination (police, fire department, security company, contractor) corresponding to a person to be detected that the person to be detected is detected by a security camera.

CITATION LIST

Patent Literature

Patent Literature 1: Japanese Unexamined Patent Application Publication No. 2011-215767

SUMMARY OF INVENTION

Technical Problem

However, the technology described in Patent Literature 1 has a problem that, for example, tracking and notification of a person to be monitored may not be appropriately performed.

In view of the above-described problems, an object of the present disclosure is to provide an information processing apparatus, an information processing method, an information processing system, and a non-transitory computer readable medium storing a program capable of appropriately performing tracking and notification of a person to be monitored.

Solution to Problem

In a first aspect according to the present disclosure, an information processing apparatus includes: determination means for determining a range for providing notification of information regarding a specific object on the basis of a moving direction of the specific object detected on the basis of an image, a position where the image has been captured, and an elapsed time since the image has been captured; and transmission means for transmitting the information regarding the specific object to a device corresponding to the range determined by the determination means.

Furthermore, in a second aspect according to the present disclosure, there is provided an information processing method including: determining a range for providing notification of information regarding a specific object on the basis of a moving direction of the specific object detected on the basis of an image, a position where the image has been captured, and an elapsed time since the image has been captured; and transmitting the information regarding the specific object to a device corresponding to the determined range.

Furthermore, in a third aspect according to the present disclosure, there is provided a non-transitory computer readable medium storing a program for causing an information processing apparatus to execute: a process of determining a range for providing notification of information regarding a specific object on the basis of a moving direction of the specific object detected on the basis of an image, a position where the image has been captured, and an elapsed time since the image has been captured; and a process of transmitting the information regarding the specific object to a device corresponding to the determined range.

Furthermore, in a fourth aspect according to the present disclosure, there is provided an information processing system including: an imaging device; a first information processing apparatus; a second information processing apparatus; and a third information processing apparatus, in which the first information processing apparatus detects a moving direction of a specific object on the basis of an image captured by the imaging device, and the second information processing apparatus includes: determination means for determining a range for providing notification of information regarding the specific object on the basis of the moving direction of the specific object detected on the basis of the image, a position where the image has been captured, and an elapsed time since the image has been captured; and transmission means for transmitting the information regarding the specific object to the third information processing apparatus corresponding to the range determined by the determination means.

Advantageous Effects of Invention

According to one aspect, it is possible to appropriately perform tracking and notification of a person to be monitored.

BRIEF DESCRIPTION OF DRAWINGS

FIG. 6 is a diagram illustrating an example of information recorded in an object DB according to the example embodiment.

EXAMPLE EMBODIMENT

Hereinafter, example embodiments of the present invention will be described with reference to the drawings.

First Example Embodiment

<Configuration>

Figure 1:
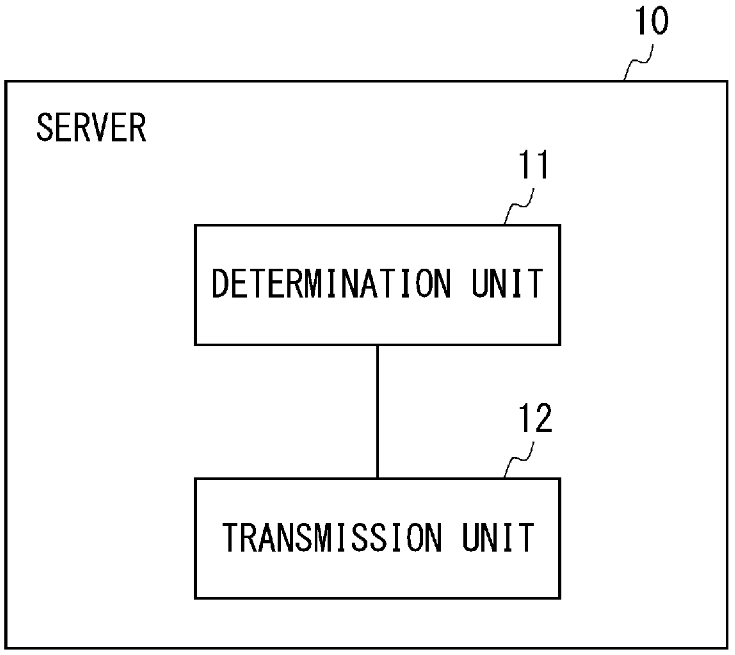
FIG. 1 is a diagram illustrating a configuration example of an information processing system according to an example embodiment.

A configuration of a server 10 according to an example embodiment will be described with reference to FIG. 1. FIG. 1 is a diagram illustrating an example of a configuration of the server 10 according to the example embodiment. The server 10 includes a determination unit 11 and a transmission unit 12. These units may be implemented by cooperation of one or more programs installed in the server 10 and hardware such as a processor 101 and a memory 102 of the server 10. Note that the server 10 is an example of an "information processing apparatus".

The determination unit 11 performs various types of determination (decision, estimation) processing. For example, the determination unit 11 determines a range (area) for providing notification of information regarding a specific object on the basis of a moving direction of the specific object detected on the basis of an image, a position where the image has been captured, and an elapsed time since the image has been captured.

The transmission unit 12 transmits various types of information from a transmission device inside or outside the server 10 to an external device. For example, the transmission unit 12 transmits information regarding a specific object to a device corresponding to the range determined by the determination unit 11.

Second Example Embodiment

Next, a configuration of an information processing system 1 according to an example embodiment will be described with reference to FIG. 2.

<System Configuration>

Figure 2:
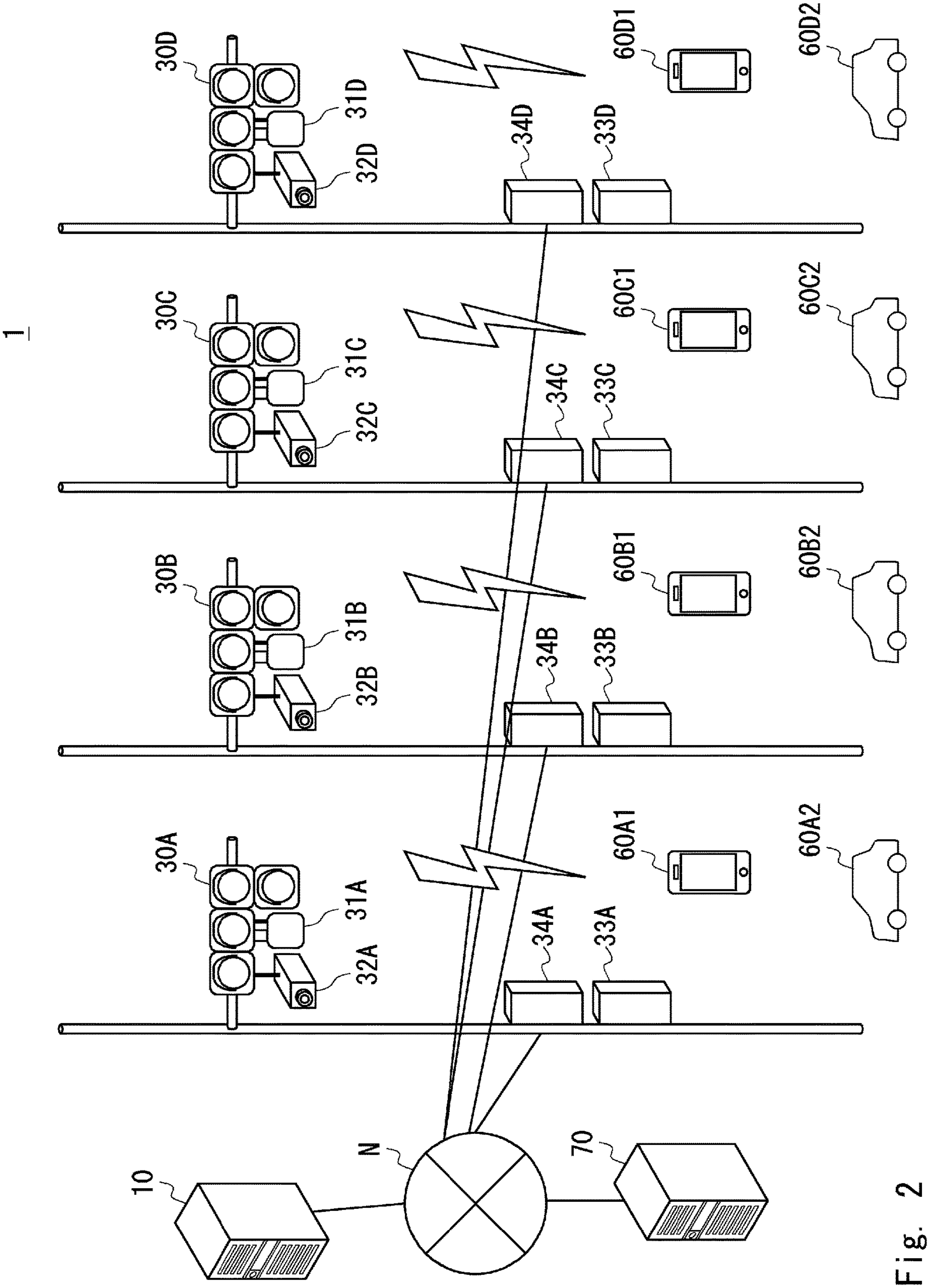
FIG. 2 is a diagram illustrating a hardware configuration example of a server, an information providing apparatus, a terminal, and a DB server according to the example embodiment.

FIG. 2 is a diagram illustrating a configuration example of the information processing system 1 according to the example embodiment. Note that, although an example in which an information providing apparatus 34 is attached to a pole (traffic light pole) to which a traffic light 30 is attached will be described below, the technology of the present disclosure is not limited thereto. For example, the information providing apparatus 34 may be attached to a pole (for example, a pole to which a road sign or the like is attached, a street light, a utility pole, or the like) to which the traffic light 30 is not attached. In this case, the traffic light 30 and a signal control apparatus 33 are not provided, and the traffic light base station and the traffic light sensor are replaced with a "roadside base station", a "roadside sensor", and the like.

In FIG. 2, the information processing system 1 includes a server 10 and a database (DB) server 70. In addition, the information processing system 1 includes traffic lights 30A to 30D (hereinafter simply referred to as a "traffic light 30" in a case where there is no need to distinguish between them). In addition, the information processing system 1 includes traffic light base stations 31A to 31D (hereinafter simply referred to as a "traffic light base station 31" in a case where there is no need to distinguish between them). In addition, the information processing system 1 includes traffic light sensors 32A to 32D (hereinafter simply referred to as a "traffic light sensor 32" in a case where there is no need to distinguish between them). In addition, the information processing system 1 includes signal control apparatuses 33A to 33D (hereinafter simply referred to as a "signal control apparatus 33" in a case where there is no need to distinguish between them). In addition, the information processing system 1 includes information providing apparatuses 34A to 34D (hereinafter simply referred to as an "information providing apparatus 34" in a case where there is no need to distinguish between them). In addition, the information processing system 1 includes terminals 60A1, 60A2, 60B1, 60B2, 60C1, 60C2, 60D1, and 60D2 (hereinafter simply referred to as a "terminal 60" in a case where there is no need to distinguish between them). Note that the numbers of the servers 10, the traffic lights 30, the traffic light base stations 31, the traffic light sensors 32, the signal control apparatuses 33, the information providing apparatuses 34, the terminals 60, and the DB servers 70 are not limited to the example of FIG. 1. Note that each of the server 10 and the information providing apparatus 34 is an example of an "information processing apparatus". The terminal 60 is an example of a "wireless communication terminal".

The server 10, the information providing apparatus 34, and the DB server 70 are connected to be able to communicate via a communication line N such as the Internet, a wireless local area network (LAN), or a mobile phone network, for example.

The traffic light 30A, the traffic light base station 31A, the traffic light sensor 32A, the signal control apparatus 33A, and the information providing apparatus 34A are connected to be able to communicate by various signal cables or wireless communication. The same applies to the traffic lights 30B to 3D, the traffic light base stations 31B to 31D, the traffic light sensors 32B to 32D, the signal control apparatuses 33B to 33D, and the information providing apparatuses 34B to 34D.

The terminal 60A1 and the terminal 60A2 (hereinafter simply referred to as a "terminal 60A" as appropriate in a case where there is no need to distinguish between them) are terminals 60 located in the traffic light base station 31A. The terminal 60B1 and the terminal 60B2 (hereinafter simply referred to as a "terminal 60B" as appropriate in a case where there is no need to distinguish between them) are terminals 60 located in the traffic light base station 31B. The terminal 60C1 and the terminal 60C2 (hereinafter simply referred to as a "terminal 60C" as appropriate in a case where there is no need to distinguish between them) are terminals 60 located in the traffic light base station 31C. The terminal 60D1 and the terminal 60D2 (hereinafter simply referred to as a "terminal 60D" as appropriate in a case where there is no need to distinguish between them) are terminals 60 located in the traffic light base station 31D.

The traffic light 30 is, for example, a traffic light that is installed on a traffic light pole of an intersection or the like of a road and controls traffic between vehicles and pedestrians by displaying green, yellow, and red arrows, and the like. The traffic light 30 includes a traffic light for a vehicle and a traffic light for a pedestrian.

The traffic light base station 31 is a base station installed on a traffic light pole. It should be noted that, the term "base station" (BS) used in the present disclosure refers to a device that can provide or host a cell or coverage in which the terminal 60 can wirelessly communicate. Examples of the traffic light base station 31 include an NR Node B (gNB), a Node B (or NB), an Evolved Node B (eNodeB or eNB), and the like. Examples of the traffic light base station 31 include a remote radio unit (RRU), a radio head (RH), a remote radio head (RRH), a low power node (for example, femto node, pico node), and the like.

The wireless communication described in the present disclosure may conform to standards such as a 5th generation mobile communications system (5G, New Radio: NR), a 4th generation mobile communication system (4G), and a 3rd generation mobile communication system (3G). Note that 4G may include, for example, long term evolution (LTE) advanced, WiMAX2, and LTE. Furthermore, the wireless communication described in the present disclosure may conform to standards such as a wideband code division multiple access (W-CDMA), a code division multiple access (CDMA), a global system for mobile (GSM), and a wireless local area network (LAN). The wireless communication of the present disclosure may also be performed in accordance with any generation of wireless communication protocols now known or developed in the future.

The traffic light sensor 32 is various types of sensors installed on a traffic light pole and configured to measure various types of information regarding a road. The traffic light sensor 32 may be, for example, a sensor such as a camera, LiDAR (Light Detection and Ranging, Laser Imaging Detection and Ranging), RADAR (radio detection and Ranging) or the like. The traffic light sensor 32 may detect, for example, positions and speeds of a vehicle, a pedestrian, and the like.

The signal control apparatus 33 is installed on a traffic light pole and controls the traffic light 30. The signal control apparatus 33 controls display of red, green, yellow, and the like of the traffic light 30 on the basis of, for example, a traffic condition detected by the traffic light sensor 32, an instruction from a center that manages traffic, preset data, or the like.

The information providing apparatus 34 generates information regarding a specific object on the basis of information acquired from the traffic light sensor 32, the signal control apparatus 33, and the like. Then, the information providing apparatus 34 transmits (provides, notifies) the generated information to an external device such as the server 10 and the DB server 70 via the traffic light base station 31.

The specific object may be, for example, a suspicious person registered in advance or a person such as a suspect. In addition, the specific object may be an animal of a specific type registered in advance. Furthermore, the specific object may be a person who has performed an action (for example, entering a no entry zone, snatching, loitering, and the like) of a specific pattern registered in advance. In addition, the specific object may be a vehicle of a specific vehicle type, color, and vehicle number.

The terminal 60 is a terminal that performs wireless communication via the traffic light base station 31. Examples of the terminal 60 include, but are not limited to, a vehicle having a wireless communication device, a smartphone, user equipment (UE), a personal digital assistant (PDA), a portable computer, a game device, a music playback device, a wearable device, and the like. Examples of the vehicle include an automobile, a motorcycle, a motorized bicycle, and a bicycle.

The DB server 70 records traffic information received from the information providing apparatus 34. The DB server 70 may be, for example, a server operated by a public institution.

The server 10 performs tracking of a specific object detected by the information providing apparatus 34 or the terminal 60, notification regarding the specific object, and the like.

<Hardware Configuration>

Figure 3:
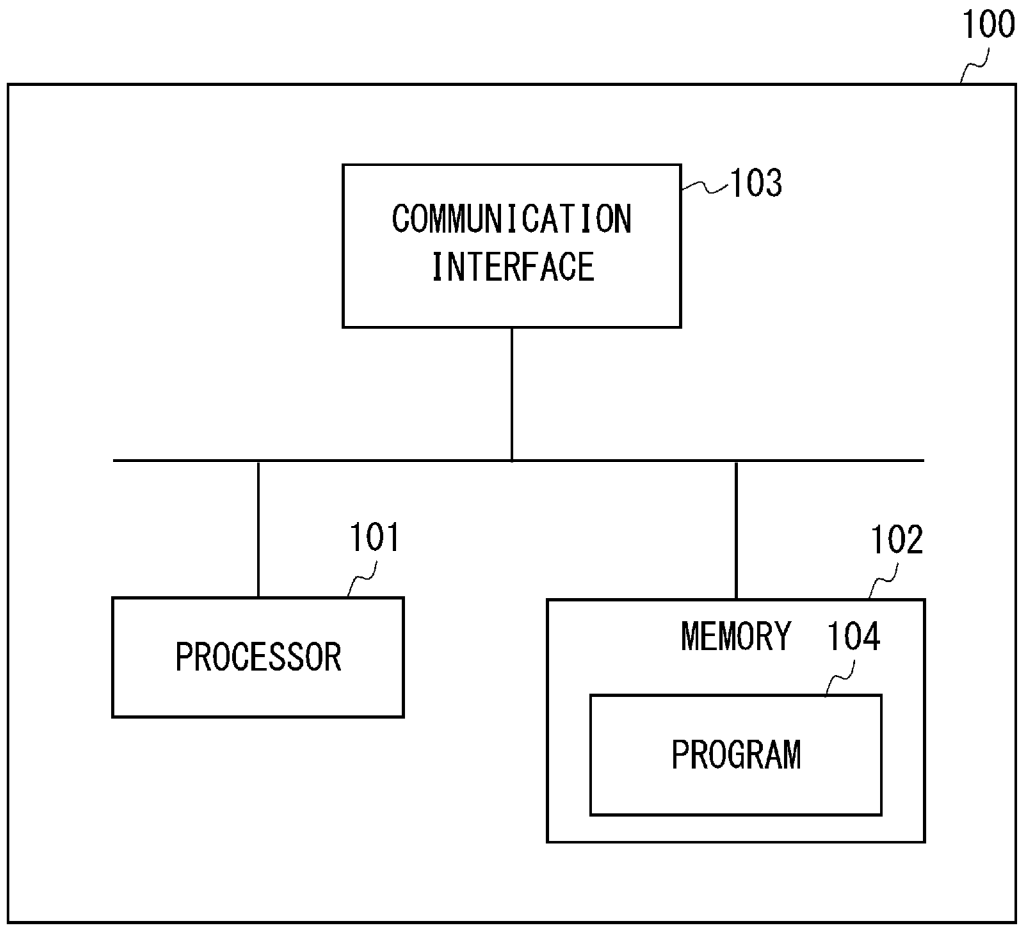
FIG. 3 is a diagram illustrating an example of a configuration of the server according to the example embodiment.

FIG. 3 is a diagram illustrating a hardware configuration example of the server 10, the information providing apparatus 34, the terminal 60, and the DB server 70 according to the example embodiment. The server 10 will be described below as an example. Note that the hardware configurations of the information providing apparatus 34, the terminal 60, and the DB server 70 may be similar to the hardware configuration of the server 10 in FIG. 3.

In the example of FIG. 3, the server 10 (a computer 100, an example of an "information processing apparatus") includes a processor 101, a memory 102, and a communication interface 103. These units may be connected by a bus or the like. The memory 102 stores at least a part of the program 104. The communication interface 103 includes an interface necessary for communication with other network elements.

When the program 104 is executed by the processor 101, the memory 102, and the like in cooperation with each other, at least a part of the processing of the example embodiment of the present disclosure is performed by the computer 100. The memory 102 may be of any type suitable for a local technology network. The memory 102 may be a non-transitory computer-readable storage medium, as a non-limiting example. The memory 102 may also be implemented using any suitable data storage technology, such as semiconductor-based memory devices, magnetic memory devices and systems, optical memory devices and systems, fixed memory and removable memory, and the like. Although only one memory 102 is illustrated in the computer 100, there may be several physically different memory modules in the computer 100. The processor 101 may be of any type. The processor 101 may include one or more of a general purpose computer, a special purpose computer, a microprocessor, a digital signal processor (DSP), and a processor based on a multi-core processor architecture as a non-limiting example. The computer 100 may have multiple processors, such as an application specific integrated circuit chip that is temporally dependent on a clock that synchronizes the main processor.

Example embodiments of the present disclosure may be implemented in hardware or dedicated circuitry, software, logic, or any combination thereof. Some aspects may be implemented in hardware, while other aspects may be implemented in firmware or software that may be executed by a controller, microprocessor or other computing device.

The present disclosure also provides at least one computer program product tangibly stored on a non-transitory computer-readable storage medium. The computer program product includes computer-executable instructions, such as those included in a program module, and executes on a device on the subject real or virtual processor to perform the processes or methods of the present disclosure. Program modules include routines, programs, libraries, objects, classes, components, data structures, and the like that execute particular tasks or implement particular abstract data types. The functionality of the program modules may be combined or divided between the program modules as desired in various example embodiments. The machine-executable instructions of the program module can be executed in a local or distributed device. In a distributed device, program modules can be located on both local and remote storage media.

Program code for executing the methods of the present disclosure may be written in any combination of one or more programming languages. These program codes are provided to a processor or controller of a general purpose computer, special purpose computer, or other programmable data processing apparatus. When the program code is executed by a processor or controller, the functions/acts in the flowcharts and/or the implementing block diagrams are performed. The program code executes entirely on the machine, partly on the machine, as a stand-alone software package, partly on the machine, partly on a remote machine, or entirely on the remote machine or server.

The program can be stored and supplied to the computer using various types of non-transitory computer readable media. Non-transitory computer readable media include various types of tangible storage media. Examples of the non-transitory computer readable medium include a magnetic recording medium, a magneto-optical recording medium, an optical disc medium, a semiconductor memory, and the like. The magnetic recording medium includes, for example, a flexible disk, a magnetic tape, a hard disk drive, and the like. The magneto-optical recording medium includes, for example, a magneto-optical disk and the like. The optical disc medium includes, for example, a Blu-ray disc, a compact disc (CD)-read only memory (ROM), a CD-recordable (R), a CD-rewritable (RW), and the like. The semiconductor memory includes, for example, a mask ROM, a programmable ROM (PROM), an erasable PROM (EPROM), a flash ROM, a random access memory (RAM), and the like. Further, the program may be supplied to the computer using various types of transitory computer readable media. Examples of the transitory computer readable media include electrical signals, optical signals, and electromagnetic waves. The transitory computer readable media can provide the program to the computer via a wired communication line such as an electric wire and optical fibers or a wireless communication line.

<Processing>

Figure 4:
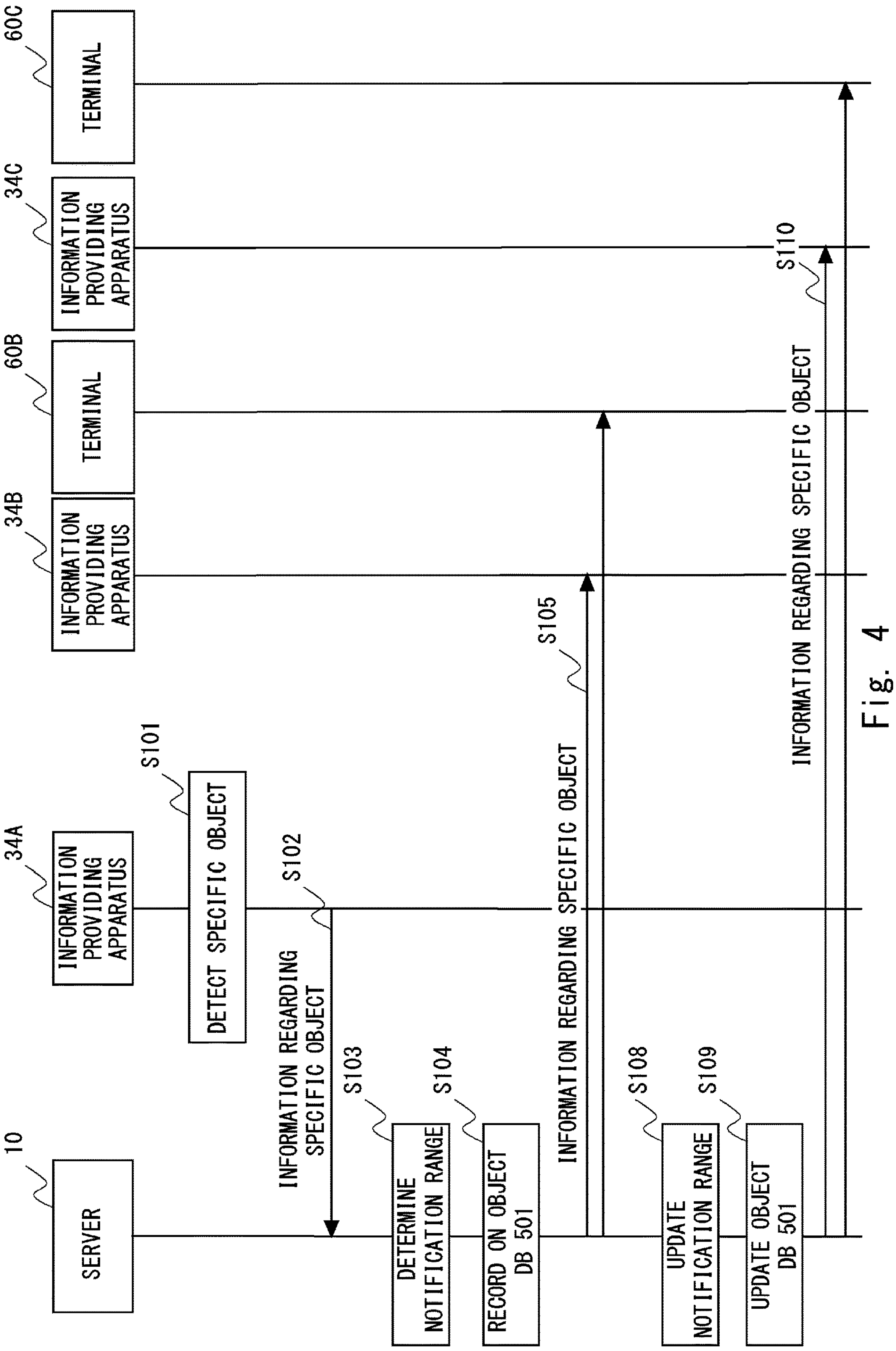
FIG. 4 is a sequence diagram illustrating an example of processing of the information processing system according to the example embodiment.
Figure 5:
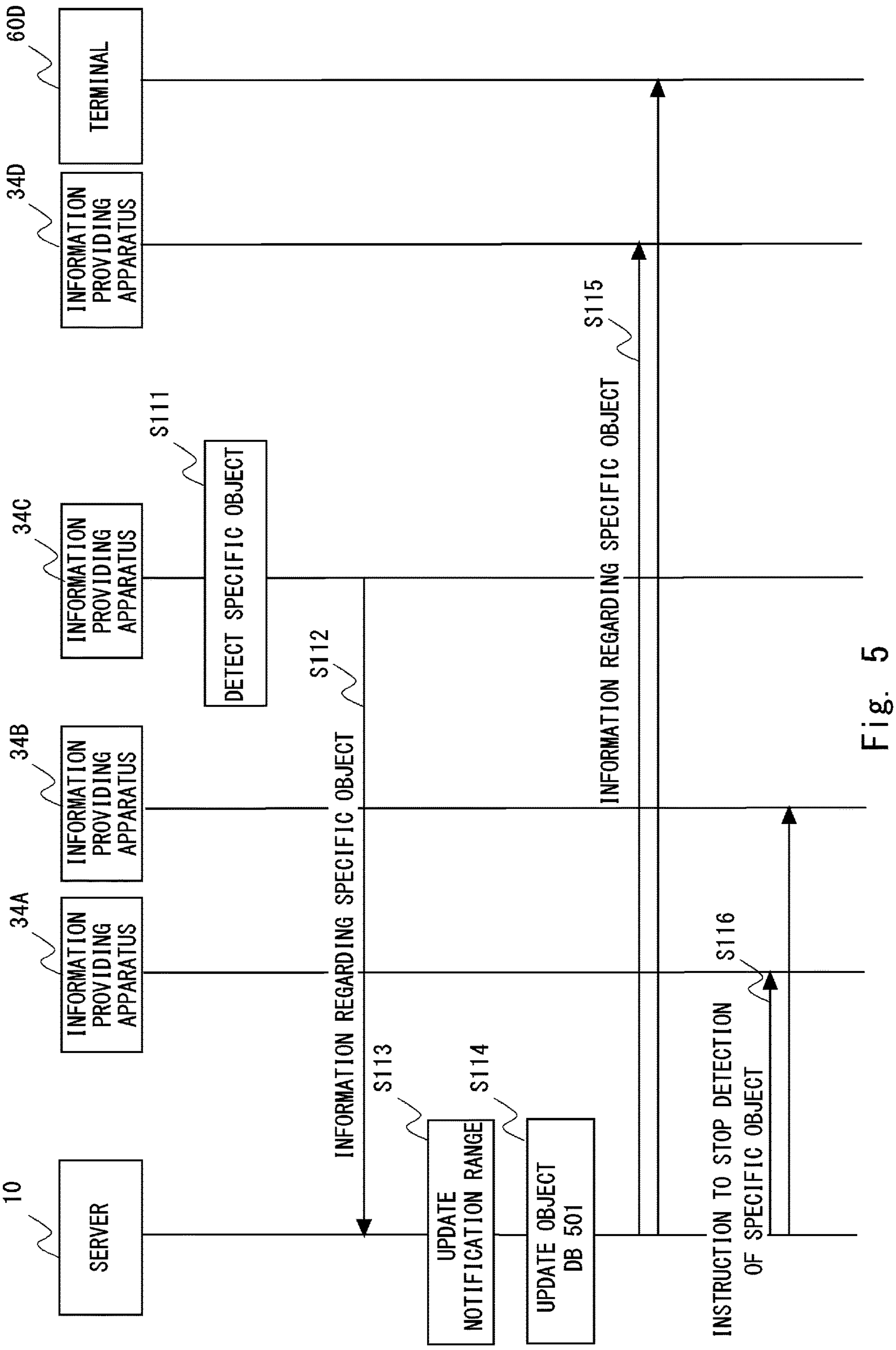
FIG. 5 is a sequence diagram illustrating an example of processing of the information processing system according to the example embodiment.
Figure 7:
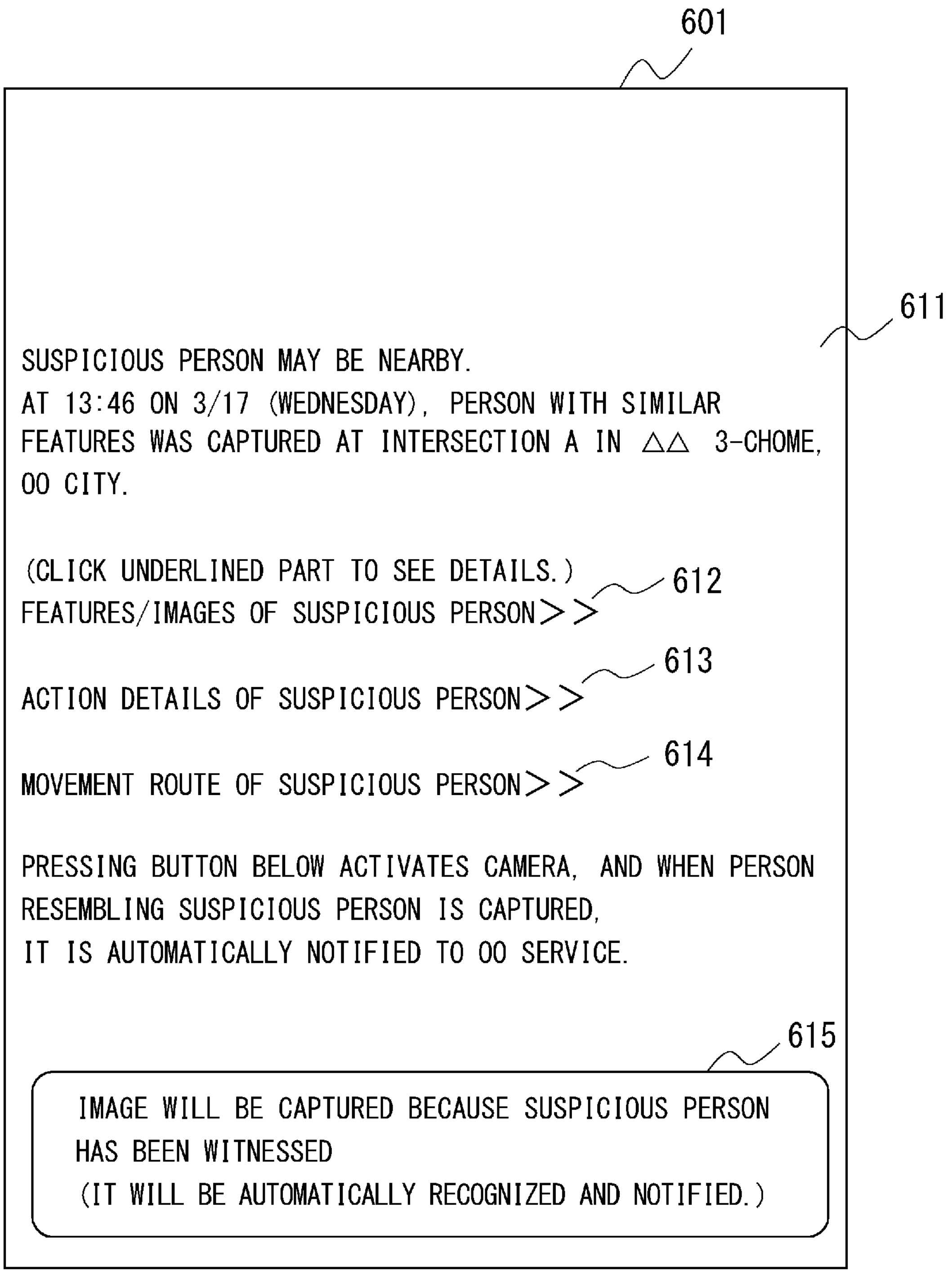
FIG. 7 is a diagram illustrating an example of a display screen in the terminal according to the example embodiment.
Figure 8:
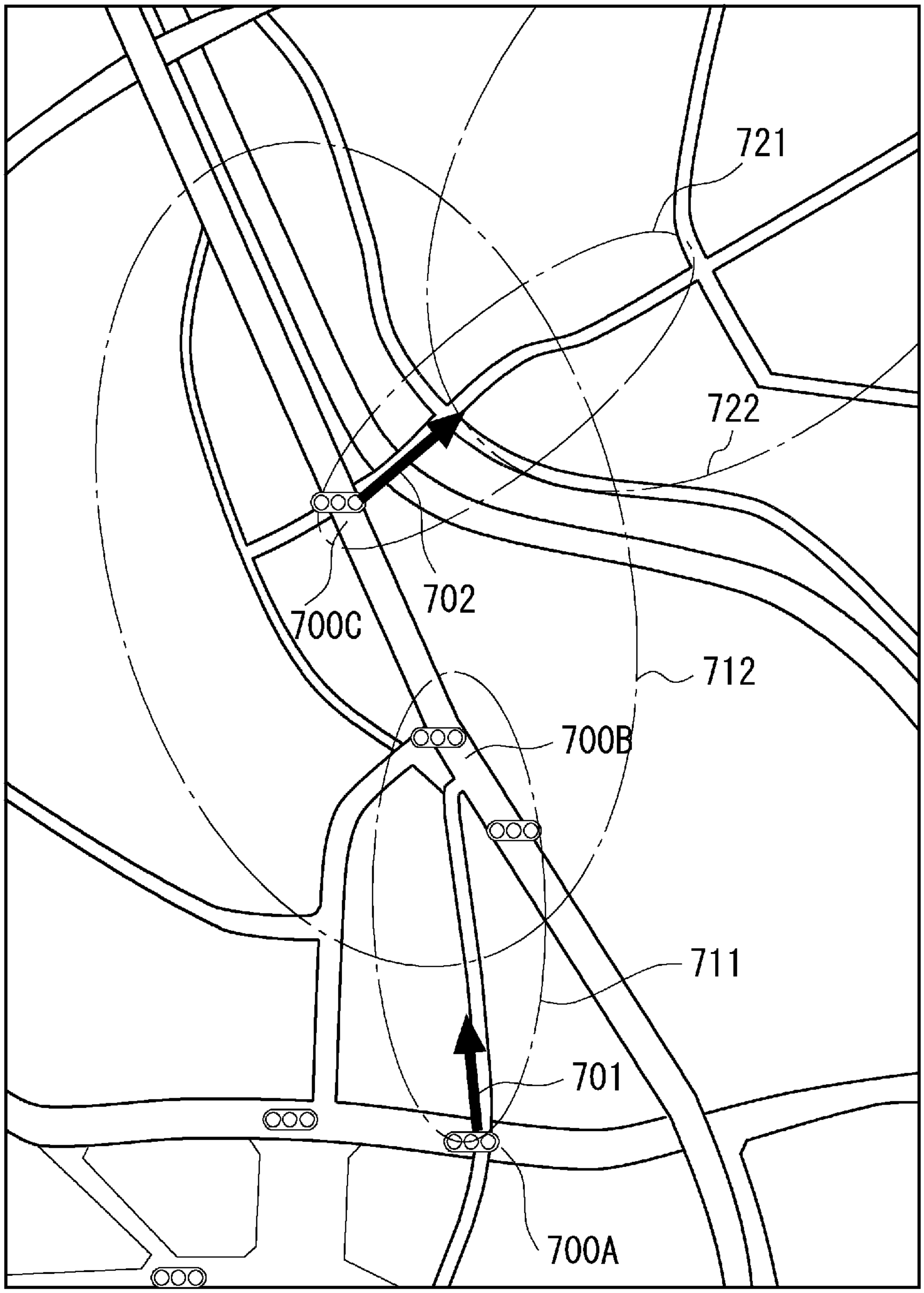
FIG. 8 is a diagram illustrating an example of a range for providing notification of information regarding a specific object at each point of time according to the example embodiment.

An example of a process of recording traffic information of the information processing system 1 according to the example embodiment will be described with reference to FIGS. 4 to 8. FIGS. 4 and 5 are sequence diagrams illustrating an example of processing of the information processing system 1 according to the example embodiment. FIG. 6 is a diagram illustrating an example of information recorded in an object DB 501 according to the example embodiment. FIG. 7 is a diagram illustrating an example of a display screen in the terminal 60 according to the example embodiment. FIG. 8 is a diagram illustrating an example of a range for providing notification of information regarding a specific object at each point of time according to the example embodiment.

In step S101, the information providing apparatus 34A detects a specific object on the basis of the image captured by the traffic light sensor 32A. Here, the information providing apparatus 34A may detect a specific object on the basis of, for example, a feature amount of an image of the specific object registered in advance and an image captured by the traffic light sensor 32A (an example of a "first imaging device"). In this case, the information providing apparatus 34A may detect a specific object by artificial intelligence (AI) using deep learning or the like, for example.

Note that the information of the feature amount of the image of the specific object may be registered in the information providing apparatus 34A from the server 10 or the like by, for example, an operation of an operator of a center who has received notification from a notifier. Furthermore, in a case where the information providing apparatus 34 detects a person who has performed an action of a specific pattern registered in advance, the information providing apparatus 34 may calculate the feature amount of the image of the person.

Subsequently, the information providing apparatus 34A notifies the server 10 of information regarding the specific object (step S102). Here, the information regarding the specific object may include, for example, information indicating a moving direction of the specific object detected on the basis of the image, information indicating a position where the image has been captured, information indicating an elapsed time since the image has been captured, and the like. Note that the information indicating the position where the image has been captured may be information (for example, latitude and longitude) indicating the installation location of the traffic light sensor 32A preset in the information providing apparatus 34A.

Subsequently, the determination unit 11 of the server 10 determines a range for providing notification of information regarding the specific object on the basis of the information regarding the specific object (step S103). Here, the server 10 may estimate the range in which the specific object is currently located on the basis of the position where the specific object has been captured by the traffic light sensor 32A, the moving direction of the specific object, and the elapsed time since the specific object has been captured by the traffic light sensor 32A. Then, the server 10 may determine the range in which the specific object is estimated to be currently located as the range for providing notification of the information regarding the specific object.

For example, as illustrated in FIG. 8, it is assumed that the elapsed time from the detection of the movement of a suspicious person or the like in the direction of an intersection 700B (the direction of a vector 701) adjacent to an intersection 700A at the intersection 700A (the start point of the vector 701) where the traffic light sensor 32A is installed is within one minute. In this case, the server 10 determines to notify the information providing apparatus 34, the terminal 60, and the like in a range 711 in which the suspicious person or the like is estimated to move from the intersection 700A to the intersection 700B within one minute of the information of the suspicious person or the like.

Furthermore, the server 10 may estimate the range in which the specific object is currently located on the basis of the following various types of information in addition to the position where the specific object has been captured, the moving direction of the specific object, and the elapsed time since the specific object has been captured. In this case, the various types of information may include, for example, at least one of transportation means of the specific object, a moving speed of the specific object, a degree of congestion of a road on which the specific object moves, and information indicating a signal switching time of the traffic light 30 on the road on which the specific object moves. Accordingly, for example, the range in which the specific object is currently located can be more appropriately estimated.

Note that the information indicating the degree of congestion of the road on which the specific object moves may be generated by the information providing apparatus 34 on the basis of the information measured by the traffic light sensor 32. In this case, the information providing apparatus 34 may calculate the degree of congestion of pedestrians on the basis of, for example, the number of persons passing through a road within a unit time. Furthermore, the information providing apparatus 34 may calculate the degree of congestion of vehicles on the basis of, for example, the number of vehicles passing through a road within a unit time. For example, the server 10 may estimate the range in which a specific person is currently located to be narrower as the degree of congestion of the pedestrian is higher. Furthermore, for example, the server 10 may estimate the range in which a specific vehicle is currently located to be narrower as the degree of congestion of the vehicle is higher.

Furthermore, the information indicating the signal switching time of the traffic light 30 on the road on which the specific object moves may include information regarding the time when the traffic light on the road in the moving direction of the specific object is permitted to progress by “green” or the like. For example, the server 10 may estimate the range in which the specific person is currently located to be wider as the time when the traffic light on the road in the moving direction of the specific object permits progress is longer.

Subsequently, the determination unit 11 of the server 10 records the determined range and the like and information regarding the specific object in the object DB 501 (step S104). In the example of FIG. 6, an image, feature information, a feature amount of an image, transportation means, a detection position, a detection time, an estimated time, a range, and notification destination information are recorded in the object DB 501 in association with an object ID. The object ID is identification information of a specific object. The image is an image of a specific object.

The feature information may include a character string indicating a feature of a specific object. In this case, the feature information may include, for example, a description of clothes of a suspicious person or the like. Furthermore, the feature information may include, for example, a vehicle type, a color, and the like of the vehicle. The feature information may be generated on the basis of an image, for example, or may be input by an operator of the center who has received notification from the notifier.

The transportation means is a type of transportation means of a specific object. The transportation means may include, for example, walking, a bicycle, a motorcycle, a normal automobile, and the like. The feature information, the feature amount of the image, and the information of the transportation means may be generated by the information providing apparatus 34 or may be generated by the server 10.

The detection position is a position where a specific object is detected on the basis of the image. The detection time is a time when a specific object is detected on the basis of the image. The estimated time is a time when a range for providing notification of information regarding the specific object (range (area) in which a specific object is estimated to be currently located; hereinafter also referred to as a “notification target range” as appropriate) is determined last (this time). The range is a notification target range determined last. The notification destination information is information indicating each notification destination (the information providing apparatus 34 and the terminal 60) included in a range for providing notification of information regarding a specific object.

Subsequently, the transmission unit 12 of the server 10 transmits the information regarding the specific object to the information providing apparatus 34B and the terminal 60B corresponding to the notification target range determined in the process of step S103 (step S105). Here, for example, the server 10 may transmit the information regarding the specific object to the information providing apparatus 34B installed within the notification target range. In addition, the server 10 may transmit the information regarding the specific object to the terminal 60B located in the traffic light base station 31B installed within the notification target range among the plurality of terminals 60.

Furthermore, the server 10 may acquire position information of each terminal 60 measured using a satellite positioning system such as GPS (Global Positioning System, Global Positioning Satellite). Then, the server 10 may transmit the information regarding the specific object to the terminal 60B located within the notification target range among the plurality of terminals 60.

In addition, the server 10 may store information of a residential area (address) of the user of each terminal 60 designated by the user of each terminal 60. Then, the server 10 may transmit information regarding the specific object to the terminal 60B residing within the notification target range among the plurality of terminals 60.

FIG. 7 illustrates an example of a display screen 601 in the terminal 60 based on the information regarding the specific object notified from the server 10. In the example of FIG. 7, the terminal 60 displays a warning message 611 based on the feature information, the detection position, the detection time, and the like recorded in the object DB 501. Furthermore, the terminal 60 displays a link 612 to an image of a specific object, a link 613 to action details, a link 614 to a movement route, and a button 615 for capturing and recognizing a specific button.

In a case where the link 613 to action details is pressed by the user, the terminal 60 acquires and displays at least part of the feature information of the specific object recorded in the object DB 501 of the server 10. In a case where the link 614 to the movement route is pressed by the user, the terminal 60 may display the movement route of the specific object on the map based on the detection time of the specific object and the history of the detection position recorded in the object DB 501 of the server 10.

(Regarding Image Processing)

In a case where the link 612 to the image of the specific object is pressed by the user, the terminal 60 acquires and displays the image of the specific object recorded in the object DB 501 of the server 10. In this case, in a case where the specific object is a person, the server 10 may process at least a part of the face area of the person in the image and cause the terminal 60 to display the processed area. Furthermore, in a case where the specific object is a vehicle, the server 10 may process at least a part of the license plate area of the vehicle in the image and cause the terminal 60 to display the processed area. Note that the server 10 may execute a process of processing the image in an internal module, or may cause an external image correction server to execute the process. The process of processing the image may be, for example, a process of applying mosaic or a process of filling with black or the like.

Furthermore, the server 10 may determine (estimate) a degree of certainty (probability) that the specific object exists for each area within the notification target range on the basis of the position where the specific object has been captured, the moving direction of the specific object, the elapsed time since the specific object has been captured, and the like. Alternatively, the server 10 may determine (estimate) a degree of certainty (probability) that the specific object exists for each area within the notification target range on the basis of the various types of information described above. Note that, as described above, the various types of information may include at least one of transportation means of a specific object, a moving speed of the specific object, a degree of congestion of a road on which the specific object moves, and information indicating a signal switching time of the traffic light 30 on the road on which the specific object moves.

Then, the server 10 may transmit the processed image obtained by processing the image of the specific object with a first degree of processing (for example, processing 10×10 pixels into the same pixel value) to the terminal 60 corresponding to the area of a first degree of certainty. Then, the server 10 may transmit the image obtained by processing the image of the specific object with a second degree of processing higher than the first degree of processing (for example, processing 20×20 pixels into the same pixel value) to the terminal 60 corresponding to the area with a second degree of certainty lower than the first degree of certainty. Accordingly, for example, in a case where the notification target range is a relatively wide range, an image in which privacy of a suspicious person or the like is more protected can be provided to a user who is less likely to encounter the suspicious person or the like.

Hereinafter, an example of a case where the specific object is not detected by either the information providing apparatus 34 or the terminal 60 within a certain period of time (for example, 10 minutes) after the process of step S105 is executed will be described. Note that, in a case where the specific object is detected by either the information providing apparatus 34 or the terminal 60, the information providing apparatus 34C may be replaced with the information providing apparatus 34B, the terminal 60B, or the like in the process after step S113.

When a predetermined time has elapsed since the specific object was captured (detected) in step S101 (an example of a "second elapsed time"), the determination unit 11 of the server 10 determines (updates) the notification target range again (step S108). For example, as illustrated in FIG. 8, it is assumed that the elapsed time from the detection of the movement of the suspicious person or the like in the direction of the intersection 700B adjacent to the intersection 700A at the intersection 700A where the traffic light sensor 32A is installed is within 10 minutes. In this case, the server 10 determines to notify the information providing apparatus 34, the terminal 60, and the like within a range 712 in which the suspicious person or the like is estimated to be moving 10 minutes after being detected at the intersection 700A of the information of the suspicious person or the like.

Note that the server 10 may determine an area not included in the previous notification target range as the current notification target range. Accordingly, for example, it is possible to reduce repetition of notification to the information providing apparatus 34, the terminal 60, and the like. Furthermore, among the information providing apparatus 34, the terminal 60, and the like corresponding to the current notification target range, only the information providing apparatus 34, the terminal 60, and the like that have not notified the information regarding the specific object may be determined as notification targets. Accordingly, for example, it is possible to prevent repeated notification to the information providing apparatus 34, the terminal 60, and the like. Furthermore, in a case where a predetermined time has elapsed since the specific object was captured by the traffic light sensor 32A, the server 10 may determine an area not including the captured position (the installation position of the traffic light sensor 32A) as the notification target range.

Subsequently, the determination unit 11 of the server 10 records the determined (updated) content in the object DB 501 (step S109). Subsequently, the transmission unit 12 of the server 10 transmits the information regarding the specific object to the information providing apparatus 34C and the terminal 60C corresponding to the determined notification target range (step S110). Note that each process from step S108 to step S110 may be similar to each process from step S103 to step S105. Note that after a specific object is detected, the server 10 repeatedly executes a process similar to each process of steps S103 to S105 at each point of time such as a predetermined time interval until the specific object is detected again by another information providing apparatus 34 or the like. Accordingly, the notification target range is updated according to the elapsed time from the last detection of the specific object.

In addition, when the specific object is detected again by another information providing apparatus 34 or the like, the server 10 repeatedly executes a process similar to each process of step S103 to step S105. Hereinafter, an example of a case where the specific object is detected by the information providing apparatus 34C within a certain period of time (for example, 10 minutes) after the process of step S110 is executed will be described. Therefore, each process of step S111 and step S112 by the information providing apparatus 34C may be similar to each process of step S101 and step S102 by the information providing apparatus 34A. In addition, each process from step S113 to step S115 may be similar to each process from step S103 to step S105.

The information providing apparatus 34C detects the specific object on the basis of the feature amount of the image of the specific object received from the server 10 and the image captured by the traffic light sensor 32C (an example of a "second imaging device") (step S111). Subsequently, the information providing apparatus 34C notifies the server 10 of information regarding the specific object (step S112). Subsequently, the server 10 determines the notification target range again on the basis of the information regarding the specific object generated on the basis of the image captured by the traffic light sensor 32C (step S113). Here, the server 10 may estimate the range in which the specific object is currently located on the basis of the position where the specific object has been captured by the traffic light sensor 32C, the moving direction of the specific object, the elapsed time since the specific object has been captured by the traffic light sensor 32C, and the like. Then, the server 10 may determine the range in which the specific object is estimated to be currently located as the notification target range.

For example, as illustrated in FIG. 8, it is assumed that the elapsed time from the detection of the movement of the suspicious person or the like in the direction of a vector 702 at an intersection 700C where the traffic light sensor 32C is installed is within one minute. In this case, the server 10 determines to notify the information providing apparatus 34, the terminal 60, and the like in a range 721 in which the suspicious person or the like is estimated to move from the intersection 700C within one minute of the information of the suspicious person or the like.

Subsequently, the determination unit 11 of the server 10 records the determined content in the object DB 501 (step S114). Subsequently, the transmission unit 12 of the server 10 transmits the information regarding the specific object to an information providing apparatus 34D and a terminal 60D corresponding to the determined notification target range (step S115).

Subsequently, the transmission unit 12 of the server 10 transmits an instruction to stop the detection of the specific object to the information providing apparatus 34A and the information providing apparatus 34B (step S116). Here, the server 10 may transmit the information (instruction, request, command) for ending the detection of the specific object to the devices not included in the devices corresponding to the current notification target range (second range) among the devices corresponding to the notification target range (first range) at a first point of time. Accordingly, the process of detecting the specific object in the information providing apparatus 34 installed in the range in which the specific object is estimated not to be located is stopped. Therefore, for example, the processing load in the information providing apparatus 34 can be reduced. Note that, in this case, in a case where the first range and the second range do not overlap, information for ending detection of a specific object is transmitted to a device corresponding to the first range.

In the example of FIG. 8, the server 10 may transmit information for ending the detection of the specific object to the information providing apparatus 34 in the range 711 other than the range 721. Then, in a case where a predetermined time (for example, 10 minutes) has elapsed since the last detection of the specific object and the notification target range is updated to the range 722, the server 10 may transmit information for ending the detection of the specific object to the information providing apparatus 34C in the range 721 other than a range 722.

In a case where the specific object is detected on the basis of the image captured by the traffic light sensor 32C, the server 10 may determine the timing for the information providing apparatus 34C to end the detection of the specific object on the basis of the degree of certainty with which the specific object has been detected in the image. The degree of certainty may be, for example, a value indicating the likelihood of the specific object calculated by AI or the like. Accordingly, in a case where the specific object is erroneously detected by a certain information providing apparatus 34, it is possible to reduce that the specific object cannot be appropriately tracked due to the stop of the detection by another information providing apparatus 34.

The server 10 may transmit information for ending the detection of the specific object after the time according to the degree of certainty has elapsed to devices not included in the devices corresponding to the second range among the devices corresponding to the first range. In this case, the server 10 may determine the time until the detection of the specific object is stopped to be longer as the degree of certainty is lower.

(Example of Controlling Traffic Light 30)

The server 10 may transmit, to the signal control apparatus 33 of the traffic light 30 according to the moving direction, information for increasing the display period of a signal such as "red" for prohibiting the progress of a specific object in the moving direction. Then, the signal control apparatus 33 may control the signal of the traffic light 30 on the basis of the information received from the server 10. Accordingly, for example, it is possible to delay the movement of the suspect or the like. Therefore, it is possible to more appropriately track the suspect or the like.

Modified Example

The server 10 may be implemented by, for example, cloud computing including one or more computers. Furthermore, the server 10 and the DB server 70 may be configured as an integrated server. Furthermore, the server 10 and the information providing apparatus 34 may be configured as an integrated server (apparatus).

The present invention is not limited to the above example embodiments, and can be appropriately changed without departing from the scope of the present invention.

Some or all of the above-described example embodiments may be described as in the following supplementary notes, but are not limited to the following supplementary notes.

(Supplementary Note 1)

An information processing apparatus including:

determination means for determining a range for providing notification of information regarding a specific object on the basis of a moving direction of the specific object detected on the basis of an image, a position where the image has been captured, and an elapsed time since the image has been captured; and transmission means for transmitting the information regarding the specific object to a device corresponding to the range determined by the determination means.

(Supplementary Note 2)

The information processing apparatus according to Supplementary Note 1, in which the transmission means is configured to transmit information regarding the specific object to a device corresponding to a range determined by the determination means when the elapsed time is a first elapsed time, and then transmit information regarding the specific object to a device corresponding to a range determined by the determination means when the elapsed time is a second elapsed time after the first elapsed time.

(Supplementary Note 3)

The information processing apparatus according to Supplementary Note 1 or 2, in which the determination means is further configured to determine a range for providing notification of information regarding the specific object on the basis of transportation means of the specific object.

(Supplementary Note 4)

The information processing apparatus according to any one of Supplementary Notes 1 to 3, in which the determination means is further configured to determine a range for providing notification of information regarding the specific object on the basis of a moving speed of the specific object.

(Supplementary Note 5)

The information processing apparatus according to any one of Supplementary Notes 1 to 4, in which the determination means is further configured to determine a range for providing notification of information regarding the specific object on the basis of a degree of congestion of a road on which the specific object moves.

(Supplementary Note 6)

The information processing apparatus according to any one of Supplementary Notes 1 to 5, in which the determination means is further configured to determine a range for providing notification of information regarding the specific object on the basis of information indicating a signal switching time of a traffic light of a road on which the specific object moves.

(Supplementary Note 7)

The information processing apparatus according to any one of Supplementary Notes 1 to 6, in which the transmission means is configured to transmit information regarding the specific object to a wireless communication terminal located in a base station installed in the range determined by the determination means.

(Supplementary Note 8)

The information processing apparatus according to any one of Supplementary Notes 1 to 7, in which the transmission means is configured to, in a case where the specific object is a person, transmit a processed image in which at least a part of a face area of the person in the image is processed.

(Supplementary Note 9)

The information processing apparatus according to any one of Supplementary Notes 1 to 6, in which the transmission means is configured to, in a case where the specific object is a vehicle, transmit a processed image in which at least a part of a license plate area of the vehicle in the image is processed.

(Supplementary Note 10)

The information processing apparatus according to Supplementary Note 8 or 9, in which the determination means is configured to determine a degree of certainty that the specific object exists for each area within a range for providing notification of information regarding the specific object on the basis of a moving direction of the specific object detected on the basis of the image, a position where the image has been captured, and an elapsed time since the image has been captured, and the transmission means is configured to:

transmit a processed image in which the image is processed with a first degree of processing to a terminal corresponding to an area with a first degree of certainty; and transmit a processed image in which the image is processed with a second degree of processing higher than the first degree of processing to a terminal corresponding to an area with a second degree of certainty lower than the first degree of certainty.

(Supplementary Note 11)

The information processing apparatus according to any one of Supplementary Notes 1 to 10, in which the transmission means is configured to transmit information for increasing a display period of a signal for prohibiting progress in the moving direction to a traffic light corresponding to the moving direction.

(Supplementary Note 12)

The information processing apparatus according to any one of Supplementary Notes 1 to 11, in which the determination means is configured to:

determine a first range for providing notification of information regarding the specific object on the basis of a moving direction of the specific object detected on the basis of a first image captured by a first imaging device, a position where the first image has been captured, and an elapsed time since the first image has been captured, and in a case where the specific object is detected on the basis of a second image captured by a second imaging device, determine a second range for providing notification of information regarding the specific object on the basis of a moving direction of the specific object detected on the basis of the second image, a position where the second image has been captured, and an elapsed time since the second image has been captured.

(Supplementary Note 13)

The information processing apparatus according to Supplementary Note 12, in which the transmission means is configured to, in a case where the specific object is detected on the basis of the second image, transmit information for ending detection of the specific object to a device that is not included in devices corresponding to the second range among devices corresponding to the first range.

(Supplementary Note 14)

The information processing apparatus according to Supplementary Note 13, in which the transmission means is configured to, in a case where the specific object is detected on the basis of the second image, transmit information for ending detection of the specific object after a time according to a degree of certainty that the specific object is detected in the second image has elapsed to a device that is not included in devices corresponding to the second range among devices corresponding to the first range.

(Supplementary Note 15)

An information processing method including:

determining a range for providing notification of information regarding a specific object on the basis of a moving direction of the specific object detected on the basis of an image, a position where the image has been captured, and an elapsed time since the image has been captured; and transmitting the information regarding the specific object to a device corresponding to the determined range.

(Supplementary Note 16)

A non-transitory computer readable medium storing a program for causing an information processing apparatus to execute:

a process of determining a range for providing notification of information regarding a specific object on the basis of a moving direction of the specific object detected on the basis of an image, a position where the image has been captured, and an elapsed time since the image has been captured; and a process of transmitting the information regarding the specific object to a device corresponding to the determined range.

(Supplementary Note 17)

An information processing system including: an imaging device; a first information processing apparatus; a second information processing apparatus; and a third information processing apparatus, in which the first information processing apparatus detects a moving direction of a specific object on the basis of an image captured by the imaging device, and the second information processing apparatus includes:

determination means for determining a range for providing notification of information regarding the specific object on the basis of the moving direction of the specific object detected on the basis of the image, a position where the image has been captured, and an elapsed time since the image has been captured; and transmission means for transmitting the information regarding the specific object to the third information processing apparatus corresponding to the range determined by the determination means.

REFERENCE SIGNS LIST

1 INFORMATION PROCESSING SYSTEM
10 SERVER
11 DETERMINATION UNIT
12 TRANSMISSION UNIT
30 TRAFFIC LIGHT
31 TRAFFIC LIGHT BASE STATION
32 TRAFFIC LIGHT SENSOR
33 SIGNAL CONTROL APPARATUS
34 INFORMATION PROVIDING APPARATUS
60 TERMINAL

70 DB SERVER

What is claimed is:

1. An information processing apparatus comprising:

at least one memory storing instructions; and at least one processor configured to execute the instructions to:

determine a range for providing notification of information regarding a specific object on the basis of a moving direction of the specific object detected on the basis of an image, a position where the image has been captured, and an elapsed time since the image has been captured;

transmit the information regarding the specific object to a device corresponding to the range;

determine a first range for providing notification of information regarding the specific object on the basis of a moving direction of the specific object detected on the basis of a first image captured by a first imaging device, a position where the first image has been captured, and an elapsed time since the first image has been captured; and in a case where the specific object is detected on the basis of a second image captured by a second imaging device, determine a second range for providing notification of information regarding the specific object on the basis of a moving direction of the specific object detected on the basis of the second image, a position where the second image has been captured, and an elapsed time since the second image has been captured.

2. The information processing apparatus according to claim 1, wherein the at least one processor is configured to transmit information regarding the specific object to a device corresponding to a determined range when the elapsed time is a first elapsed time, and then transmit information regarding the specific object to a device corresponding to a determined range when the elapsed time is a second elapsed time after the first elapsed time.

3. The information processing apparatus according to claim 1, wherein the at least one processor is further configured to determine a range for providing notification of information regarding the specific object on the basis of a transportation means of the specific object.

4. The information processing apparatus according to claim 1, wherein the at least one processor is further configured to determine a range for providing notification of information regarding the specific object on the basis of a moving speed of the specific object.

5. The information processing apparatus according to claim 1, wherein the at least one processor is further configured to determine a range for providing notification of information regarding the specific object on the basis of a degree of congestion of a road on which the specific object moves.

6. The information processing apparatus according to claim 1, wherein the at least one processor is further configured to determine a range for providing notification of information regarding the specific object on the basis of information indicating a signal switching time of a traffic light of a road on which the specific object moves.

7. The information processing apparatus according to claim 1, wherein the at least one processor is configured to transmit information regarding the specific object to a wireless communication terminal located in a base station installed in the determined range.

8. The information processing apparatus according to claim 1, wherein the at least one processor is configured to, in a case where the specific object is a person, transmit a processed image in which at least a part of a face area of the person in the image is processed.

9. The information processing apparatus according to claim 1, wherein the at least one processor is configured to, in a case where the specific object is a vehicle, transmit a processed image in which at least a part of a license plate area of the vehicle in the image is processed.

10. The information processing apparatus according to claim 1, wherein the at least one processor is configured to:

determine a degree of certainty that the specific object exists for each area within a range for providing notification of information regarding the specific object on the basis of a moving direction of the specific object detected on the basis of the image, a position where the image has been captured, and an elapsed time since the image has been captured;

transmit a processed image in which the image is processed with a first degree of processing to a terminal corresponding to an area with a first degree of certainty; and transmit a processed image in which the image is processed with a second degree of processing higher than the first degree of processing to a terminal corresponding to an area with a second degree of certainty lower than the first degree of certainty.

11. The information processing apparatus according to claim 1, wherein the at least one processor is configured to transmit information for increasing a display period of a signal for prohibiting progress in the moving direction to a traffic light corresponding to the moving direction.

12. The information processing apparatus according to claim 1, wherein the at least one processor is configured to, in a case where the specific object is detected on the basis of the second image, transmit information for ending detection of the specific object to a device that is not included in devices corresponding to the second range among devices corresponding to the first range.

13. The information processing apparatus according to claim 12, wherein the at least one processor is configured to, in a case where the specific object is detected on the basis of the second image, transmit information for ending detection of the specific object after a time according to a degree of certainty that the specific object is detected in the second image has elapsed to a device that is not included in devices corresponding to the second range among devices corresponding to the first range.

14. An information processing method comprising:

determining a range for providing notification of information regarding a specific object on the basis of a moving direction of the specific object detected on the basis of an image, a position where the image has been captured, and an elapsed time since the image has been captured;

transmitting the information regarding the specific object to a device corresponding to the determined range;

determining a first range for providing notification of information regarding the specific object on the basis of a moving direction of the specific object detected on the basis of a first image captured by a first imaging device, a position where the first image has been captured, and an elapsed time since the first image has been captured; and in a case where the specific object is detected on the basis of a second image captured by a second imaging device, determining a second range for providing notification of information regarding the specific object on the basis of a moving direction of the specific object detected on the basis of the second image, a position where the second image has been captured, and an elapsed time since the second image has been captured.

15. A non-transitory computer readable medium storing a program for causing an information processing apparatus to execute:

determining a range for providing notification of information regarding a specific object on the basis of a moving direction of the specific object detected on the basis of an image, a position where the image has been captured, and an elapsed time since the image has been captured;

transmitting the information regarding the specific object to a device corresponding to the determined range;

determining a first range for providing notification of information regarding the specific object on the basis of a moving direction of the specific object detected on the basis of a first image captured by a first imaging device, a position where the first image has been captured, and an elapsed time since the first image has been captured; and in a case where the specific object is detected on the basis of a second image captured by a second imaging device, determining a second range for providing notification of information regarding the specific object on the basis of a moving direction of the specific object detected on the basis of the second image, a position where the second image has been captured, and an elapsed time since the second image has been captured.

* * * * *